United States Patent
Watanabe (10) Patent No.: US 7,624,504 B2
(45) Date of Patent: Dec. 1, 2009

(54) METHOD OF ATTACHING HOSE COUPLING TO HOSE

(75) Inventor: Koichi Watanabe, Hiratsuka (JP)

(73) Assignee: The Yokohama Rubber, Co., Ltd., Tokyo (JP)

( * ) Notice: Subject to any disclaimer, the term of this patent is extended or adjusted under 35 U.S.C. 154(b) by 401 days.

(21) Appl. No.: 11/500,374

(22) Filed: Aug. 8, 2006

(65) Prior Publication Data

US 2006/0277740 A1    Dec. 14, 2006

Related U.S. Application Data

(62) Division of application No. 10/496,835, filed as application No. PCT/JP02/09614 on Sep. 19, 2002, now abandoned.

(30) Foreign Application Priority Data

Mar. 22, 2002    (JP) ............................... 2002-80509

(51) Int. Cl.
*B23P 17/00*    (2006.01)
*B23P 11/00*    (2006.01)

(52) U.S. Cl. ................... 29/890.144; 29/432.1; 29/508; 29/516; 29/283.5; 285/256; 285/382; 403/282; 403/283

(58) Field of Classification Search ............ 29/890.144, 29/508, 516, 283.5, 432, 432.1, 432.2; 285/256, 285/382, 258; 403/282, 285
See application file for complete search history.

(56) References Cited

U.S. PATENT DOCUMENTS

| | | | | |
|---|---|---|---|---|
| 2,300,517 A | 11/1942 | Milton | ........................ | 285/256 |
| 2,374,225 A | 4/1945 | Walter | ..................... | 285/222.4 |
| 2,572,645 A | 10/1951 | Walter | ........................ | 285/256 |
| 2,661,225 A | 12/1953 | Lyon | ........................... | 285/256 |
| 2,797,111 A | 6/1957 | Thomas | ....................... | 285/256 |
| 3,347,571 A | 10/1967 | New | ............................. | 285/256 |
| 3,423,109 A | 1/1969 | New et al. | .................... | 285/256 |
| 4,150,466 A | 4/1979 | Horvath | ....................... | 285/382 |
| 4,369,992 A | 1/1983 | Fournier et al. | ............. | 285/256 |
| 4,498,691 A | 2/1985 | Cooke | ......................... | 285/256 |
| 4,564,223 A | 1/1986 | Burrington | .................. | 285/256 |
| 4,664,424 A | 5/1987 | Smith | .......................... | 285/256 |
| 4,684,157 A | 8/1987 | Smith | .......................... | 285/256 |
| 4,804,212 A * | 2/1989 | Vyse | ........................... | 285/256 |

(Continued)

FOREIGN PATENT DOCUMENTS

EP    267709 A1 *    5/1988

(Continued)

*Primary Examiner*—Jermie E Cozart
(74) *Attorney, Agent, or Firm*—Kubovcik & Kubovcik (57) ABSTRACT

A hose coupling according to the present invention for securing a hose has a cylindrical nipple and a cylindrical socket disposed radially outwardly thereof. A plurality of circumferentially extending annular hose gripping projections are provided on a radially inner surface of the socket in a predetermined interval along a longitudinal direction of the nipple. The hose comprises an elastic tube layer and a reinforcing layer disposed radially outwardly thereof, and is to be secured between the nipple and the socket by crimping the socket after the hose is inserted between the nipple and the socket. At least one hose gripping projection of the plurality of hose gripping projections protrudes radially inwardly of the socket greater than other hose gripping projections.

14 Claims, 4 Drawing Sheets

U.S. PATENT DOCUMENTS

| | | | |
|---|---|---|---|
| 5,255,944 A | 10/1993 | Blin et al. | 285/256 |
| 5,267,758 A | 12/1993 | Shah et al. | 285/256 |
| 5,306,051 A | 4/1994 | Loker et al. | 285/222.1 |
| 5,607,191 A * | 3/1997 | Wilson | 285/256 |

FOREIGN PATENT DOCUMENTS

| | | |
|---|---|---|
| JP | 2001-41377 A | 2/2001 |

* cited by examiner

Prior Art

Fig.8

Prior Art

METHOD OF ATTACHING HOSE COUPLING TO HOSE

This application is a divisional of U.S. patent application Ser. No. 10/496,835 filed May 27, 2004, now abandoned, which is a 371 of International Application No. PCT/JP02/09614 filed Sep. 19, 2002, which claims priority based on Japanese Patent Application No. 2002-80509 filed Mar. 22, 2002, which is incorporated herein by reference.

TECHNICAL FIELD

The present invention relates to hose couplings for connecting a hose to an equipment and attachment constructions of a hose coupling and a hose, and more particularly, to a hose coupling which is a crimping type hose coupling and a attachment structure of the hose coupling and a hose in which a sealing ability can be improved while keeping its advantages.

TECHNICAL BACKGROUND

Figure 7:
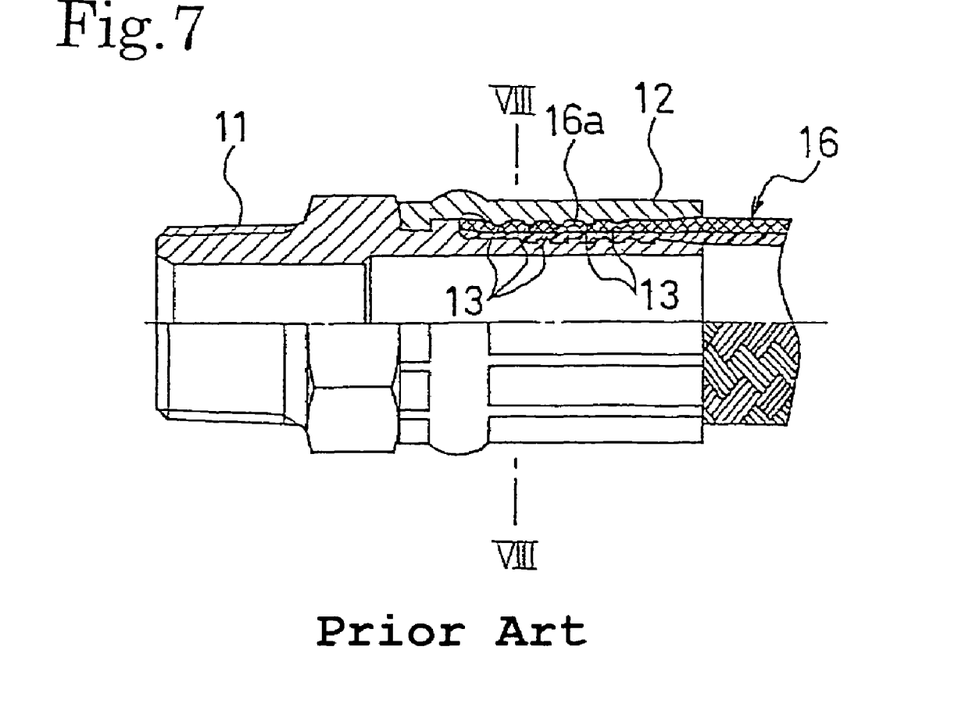
FIG. 7 is a front view showing a conventional crimping type hose coupling, the upper side of the coupling from its centerline being illustrated in cross-section, with a hose attached thereto.

Conventionally, there is a crimping type coupling as a hose coupling for connecting a hose to an apparatus, as shown in FIG. 7. The coupling includes a cylindrical nipple 11 and a cylindrical socket 12 disposed radially outwardly thereof. Provided on the radially inner surface of the socket 12 in a predetermined interval along the longitudinal direction of the socket are circumferentially extending annular projections 13 with an equal height for gripping a hose.

Figure 8:
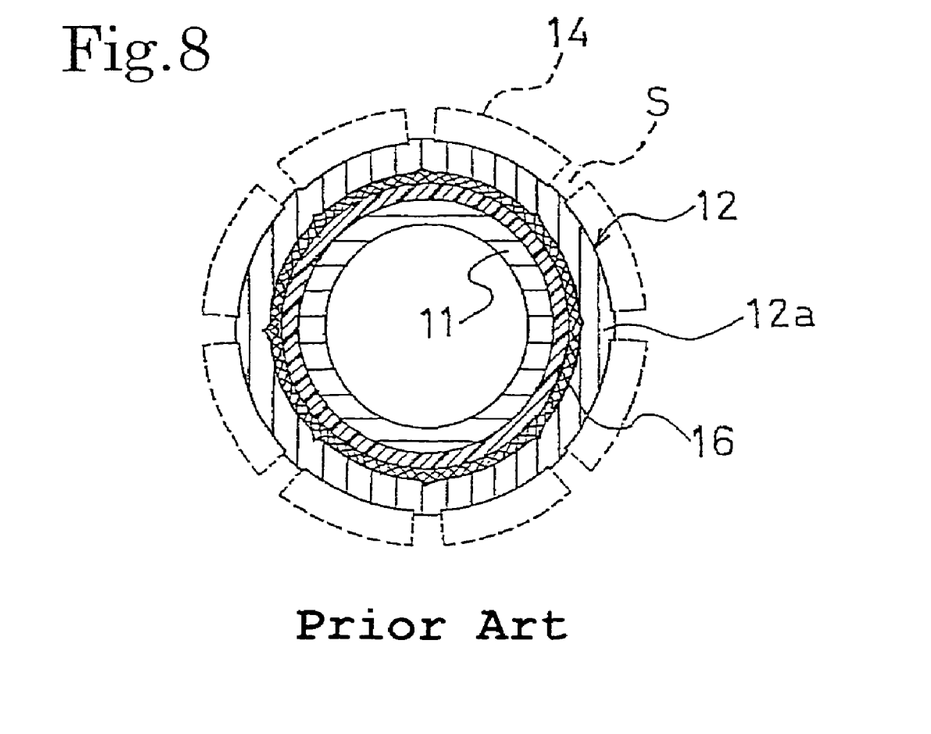
FIG. 8 is a cross-sectional view taken along the line VIII-VIII in FIG. 7.

As shown in FIG. 8, a hose 16 is attached in such a manner that the socket 12 is crimped from its radially outer side by a plurality of crimping claws 14 to press the socket 12 to be smaller in diameter, thereby securing between the nipple 11 and the crimped socket 12 one end 16a of the hose 16 which has been inserted therebetween.

The crimping type hose coupling described above can quickly and easily secure the hose 16 using the crimping claws 14 and is thus advantageous in hose attachment workability, allowing the attachment working cost to be inexpensive. Also, various shaped ferrules can be employed therefor, and furthermore, in securing a hose which has been assembled to an elbow type coupling, the arrangement of the hose angle can be easy.

When the socket 12 is crimped from the radially outer side by the crimping claws 14, however, some gaps S between the crimping claws 14 are produced, resulting in that portions 12a of the socket 12 corresponding to the gaps S can not be effectively crimped. The force that compresses the hose 11 against the nipple 16, and the sealing ability between the inner surface of the hose 16 and the nipple 11 in the areas of the portions 12a, is reduced. As a result, crimping type hose couplings are limited to use in a low pressure range.

DISCLOSURE OF THE INVENTION

It is an object of the present invention to provide a crimping type hose coupling and attachment construction of the hose coupling and a hose which can improve a sealing ability without losing the above-mentioned advantages.

In order to achieve the aforementioned object, a hose coupling according to the present invention includes a cylindrical nipple and a cylindrical socket disposed radially outwardly thereof, a plurality of circumferentially extending annular hose gripping projections being provided on a radially inner surface of the socket in a predetermined interval along a longitudinal direction of the nipple, a hose which comprises an elastic tube layer and a reinforcing layer disposed radially outwardly thereof being to be secured between the nipple and the socket by crimping the socket after the hose is inserted between the nipple and the socket, wherein at least one hose gripping projection of the plurality of hose gripping projections protrudes radially inwardly of the socket greater than other hose gripping projections.

An alternative hose coupling according to the present invention includes a cylindrical nipple and a cylindrical socket disposed radially outwardly thereof, a hose which comprises an elastic tube layer and a reinforcing layer disposed radially outwardly thereof being to be secured between the nipple and the socket by crimping the socket after the hose is inserted between the nipple and the socket, wherein a circumferentially extending annular hose gripping projection is provided on a radially inner surface of the socket, the hose gripping projection having a projection height which enables the elastic tube layer to be compressed at a compression rate of 55% or more, when the hose has been secured by crimping between the nipple and the socket.

Another alternative hose coupling according to the present invention includes a cylindrical nipple and a cylindrical socket disposed radially outwardly thereof, a plurality of circumferentially extending annular hose gripping projections being provided on a radially inner surface of the socket in a predetermined interval along a longitudinal direction of the nipple, a hose which comprises an elastic tube layer and a reinforcing layer disposed radially outwardly thereof being to be secured between the nipple and the socket by crimping the socket after the hose is inserted between the nipple and the socket, wherein at least one circumferentially extending projection is provided on a radially outer surface of the nipple.

Still another alternative hose coupling according to the present invention includes a cylindrical nipple and a cylindrical socket disposed radially outwardly thereof, a hose which comprises an elastic tube layer and a reinforcing layer disposed radially outwardly thereof being to be secured between the nipple and the socket by crimping the socket after the hose is inserted between the nipple and the socket, wherein at least one circumferentially extending projection is provided on a radially outer surface of the nipple, the at least one projection having a projection height which enables the elastic tube layer to be compressed at a compression rate of 55% or more, when the hose has been secured by crimping between the nipple and the socket.

A hose coupling and hose attachment construction according to the present invention includes a hose coupling comprising a cylindrical nipple and a cylindrical socket disposed radially outwardly thereof, and a hose comprising an elastic tube layer and a reinforcing layer disposed radially outwardly thereof, a plurality of circumferentially extending annular hose gripping projections being provided on a radially inner surface of the socket in a predetermined interval along a longitudinal direction of the nipple, the hose being secured to the hose coupling by crimping the socket after the hose is inserted between the nipple and the socket, wherein at least one hose gripping projection of the plurality of hose gripping projections protrudes greater into the hose than other hose gripping projections.

Another hose coupling and hose attachment construction includes a hose coupling comprising a cylindrical nipple and a cylindrical socket disposed radially outwardly thereof, and a hose comprising an elastic tube layer and a reinforcing layer disposed radially outwardly thereof, a circumferentially extending annular hose gripping projection being provided on a radially inner surface of the socket, the hose being secured to the hose coupling by crimping the socket after the hose is inserted between the nipple and the socket, wherein the hose gripping projection protrudes into the hose so that the elastic tube layer is compressed at a compression rate of 55% or more.

According to the present invention described above, a hose gripping projection with a higher projection height or an annular projection provided on the radially outer surface of the nipple protrudes into the hose, thereby allowing the hose to be secured with a part of the hose into which the projection has protruded being compressed greater than in the prior art. Therefore, a press-fitting force of the elastic tube layer against each radially outer surface part of the nipple which is corresponding to each part that is free from crimping due to the affection of gaps, is increased because of the elastic material of the elastic tube layer extruded away by the projection, thereby permitting the sealing ability to be improved.

Since only the projection height of the hose gripping projection is made greater, or an annular projection is provided on the radially outer surface of the nipple, the specific advantages of the crimping type hose coupling can not be reduced.

BEST MODES FOR CARRYING OUT THE INVENTION

The embodiments of the present invention will be described below with reference to the drawings.

Figure 1:
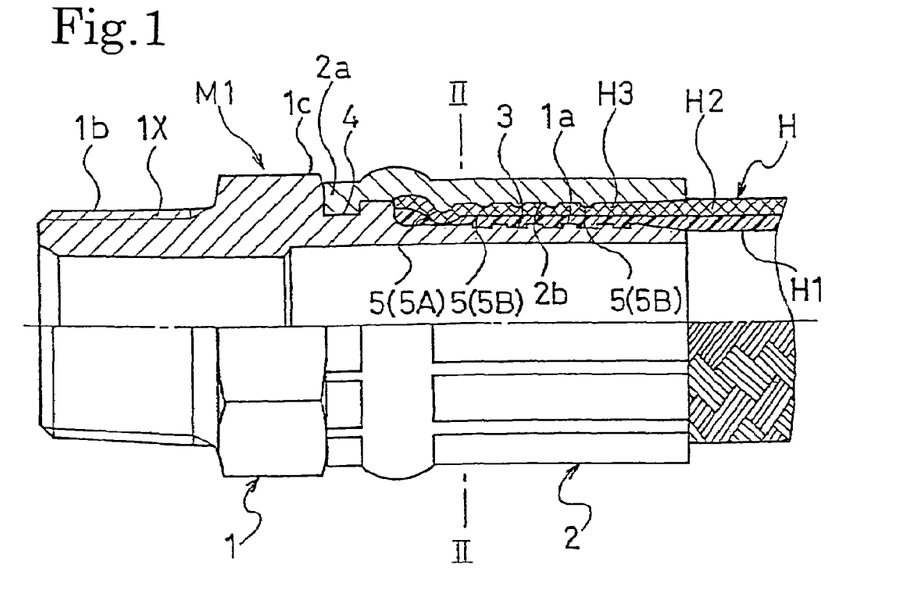
FIG. 1 is a front view showing one embodiment of a hose coupling according to the present invention, the upper side of the coupling from its centerline being illustrated in cross-section, with a hose attached thereto.

Referring to FIG. 1, one embodiment of a hose coupling according to the present invention is designated by M1. A hose H comprising an elastic tube layer H1 and a reinforcing layer H2 disposed radially outwardly thereof is attached to the hose coupling M1.

The hose coupling M1 includes a cylindrical nipple 1 made of metal and a cylindrical socket 2 made of metal disposed radially outwardly thereof. The nipple 1 has a radially outer surface portion 1$a$ in the hose insertion side, which has a plurality of circumferentially extending annular grooves 3 disposed in a predetermined interval along a longitudinal direction of the nipple, the radially inner side of the elastic tube layer H1 of the hose H attached thereto being latched into the grooves 3.

Formed on the radially outer surface portion 1$b$, in the hose anti-insertion side, of the nipple 1 is a threaded portion 1X, through which the hose coupling M1 is to be attached to a device. The radially outer surface portion 1$c$ of the center portion of the nipple 1 has a circumferentially extending annular groove 4, to which an end portion 2$a$, in the hose anti-insertion side, of the socket 2 is attached.

Provided on the radially inner surface portion 2$b$ of the socket 2 facing the radially outer surface 1$a$ of the hose insertion side of the nipple 1 in a predetermined interval along a longitudinal direction of the socket are a plurality of circumferentially extending annular projections 5 for gripping the hose. One hose gripping projection 5A of the plurality of the hose gripping projections 5, which is positioned on the hose anti-insertion side of the grooves 3 and is nearest to the hose anti-insertion side of the nipple, projects radially inward longer than the other hose gripping projections 5B, whereby its projection height is greater. The other hose gripping projections 5B have the same projection height as in the prior art.

The hose gripping projection 5A has a projection height such that, as shown in FIG. 1, when the end portion H3 of the hose H has been inserted between the nipple 1 and socket 2 and the socket 2 has been crimped to secure the hose, the reinforcing layer H2 protrudes into the elastic tube layer H1 to break the elastic tube layer H1 and can be press-fitted onto the radially outer surface portion 1$a$ of the nipple 1.

Figure 2:
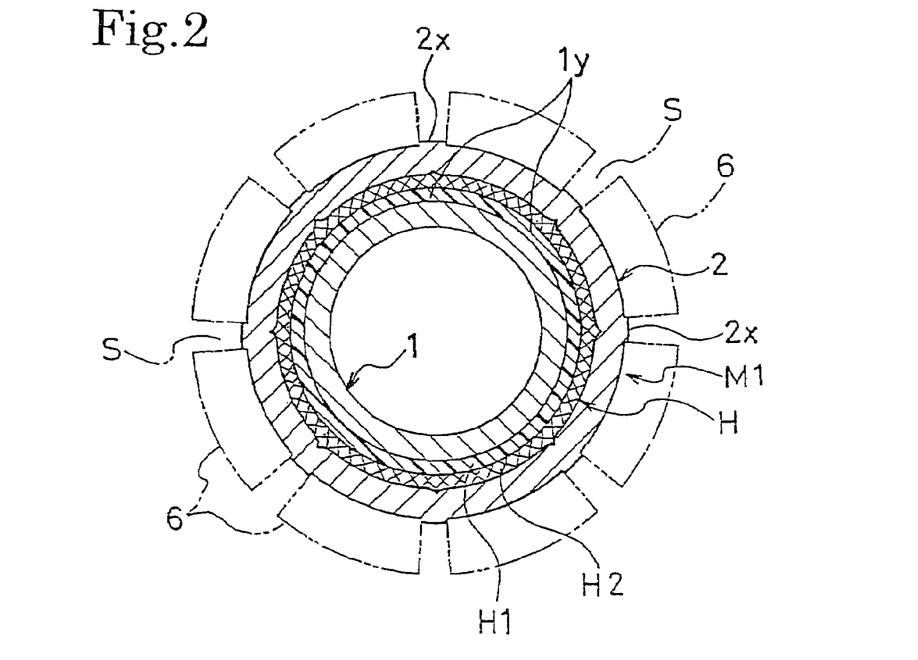
FIG. 2 is a cross-sectional view taken along the line II-II in FIG. 1.

The attachment of the hose H to the hose coupling M1 is done, as shown in FIG. 2, by crimping the socket 2 from its radially outer side by means of a plurality of crimping claws 6, whereby the end portion H3 of the hose H which has been inserted is secured by crimping between the nipple 1 and the socket 2 which has been reduced in diameter. This allows the hose gripping projection 5A having a greater projection height to protrude deeper into the hose H than the other hose gripping projections 5B, whereby the reinforcing layer H2 breaks into the elastic tube layer H1 and extrudes away the elastic material of the portion into which the reinforcing layer H2 has broken. As a result, the reinforcing layer H2 is directly press-fitted onto the radially outer surface portion 1$a$ of the nipple 1.

When crimped, parts 2$x$ which are free from crimping are produced in the socket 2 as in the prior art, due to the affection of gaps S between the crimping claws 6. However, a press-fitting force of the elastic tube layer H1 against each radially outer surface part 1$y$ which is corresponding to the part 2$x$ that is free from crimping is increased because of the elastic material extruded away by the reinforcing layer H2, thereby allowing the sealing ability to be improved.

Since only the projection height of the hose gripping projection 5A is made greater, the specific advantages of the crimping type hose coupling, namely, hose attachment workability, possibility of employing various shaped ferrules, easy angle arrangement of a hose which has been assembled to an elbow type coupling when attached, and the like can not be reduced at all.

The reinforcing layer H2 is clamped directly between the nipple 1 and the hose gripping projection 5A of the socket 2, thereby allowing hose gripping capability to be greatly increased.

In the embodiment of FIG. 1, the hose gripping projection 5 having a greater projection height is the hose gripping projection 5A positioned nearest to the hose anti-insertion side; it is preferable, as described above, that the hose gripping projection 5A be greater in terms of durability because, when the hose H attached is used in a curved condition, load applied to the hose gripping projection 5A with a greater projection height can be reduced. However, another hose gripping projection 5B may have a greater projection height, thereby enabling the same effect as described above to be obtained.

As required, several hose gripping projections 5 may have a greater projection height, and at least one of the hose gripping projections 5 may be formed as the above-mentioned hose gripping projection with a greater projection height. When the several hose gripping projections 5 have a greater projection height, it is preferable that they may be the hose gripping projections positioned nearer to the hose anti-insertion side.

It is preferable, in terms of increasing hose gripping capability, that the hose gripping projection 5A have a greater projection height which allows the reinforcing layer H2 to break the elastic tube layer H1 to be press-fitted onto the radially outer surface portion 1a of the nipple 1, that is, when the hose H is secured by crimping between the nipple 1 and the socket 2, the compression rate of the elastic tube layer H1 is 100% (the state in which any part of the elastic tube layer does not exist). In terms of improving the sealing ability, however, the compression rate of the elastic tube layer H1 may be 55% or more. Preferably, the hose gripping projection 5A may have a greater projection height which enables the elastic tube layer H1 to be compressed at a compression rate 10% greater than that of the part of the elastic tube layer H1 which is compressed by a part of the radially inner surface portion 2b of the socket 2 adjacent to the hose gripping projection 5A to further improve the sealing ability.

Figure 3:
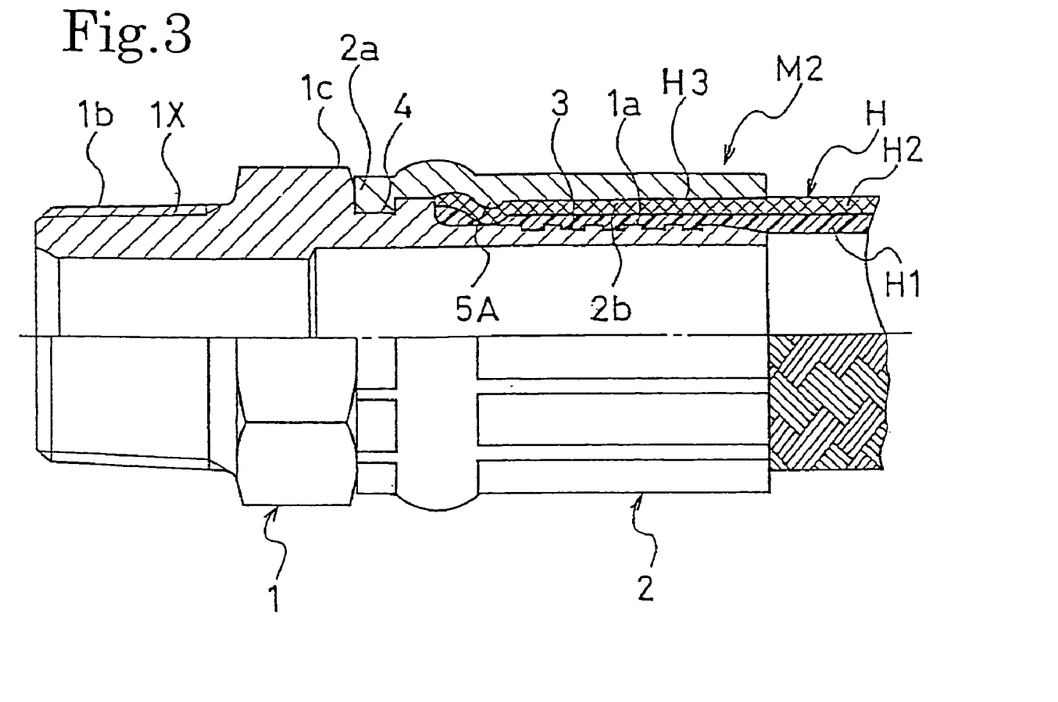
FIG. 3 is a front view showing an alternative embodiment of a hose coupling according to the present invention, the upper side of the coupling from its centerline being illustrated in cross-section, with a hose attached thereto.

FIG. 3 shows an alternative embodiment of a hose coupling according to the present invention, with the hose H attached thereto. The hose coupling M2 has the same construction as the hose coupling M1 of FIG. 1 except that only a hose gripping projection 5A with a greater projection height is provided on the radially inner surface portion 2a of the socket 2. When the hose H is attached, the hose gripping projection 5A protrude deep into the hose H, whereby the reinforcing layer H2 breaks into the elastic tube layer H1 and extrudes away the elastic material of the portion into which the reinforcing layer H2 has broken, resulting in that the reinforcing layer H2 is directly press-fitted onto the radially outer surface portion 1a of the nipple 1.

Since hose gripping capability is increased by directly clamping the reinforcing layer H2 between the nipple 1 and the socket 2, it is not necessary to provide other hose gripping projections 5B. The hose coupling M2 having such a construction can obtain the same effects as described above.

It is preferable, in terms of greatly increasing hose gripping capability, that the hose gripping projection 5A shown in FIG. 3 have a projection height which allows the reinforcing layer H2 to break the elastic tube layer H1 to be press-fitted onto the radially outer surface 1a of the nipple 1, when the socket 2 is crimped, as shown in the drawing. The projection height, however, may be arranged such that the compression rate of the elastic tube layer H1 is 55% or more in order to effectively improve the sealing ability while ensuring the same hose gripping capability as in the prior art. Preferably, the hose gripping projection 5A may have a projection height which enables the elastic tube layer H1 to be compressed at a compression rate 10% greater than that of the part of the elastic tube layer H1 which is compressed by the part of the radially inner surface portion 2b of the socket 2, as in the above-mentioned embodiment.

Figure 4:
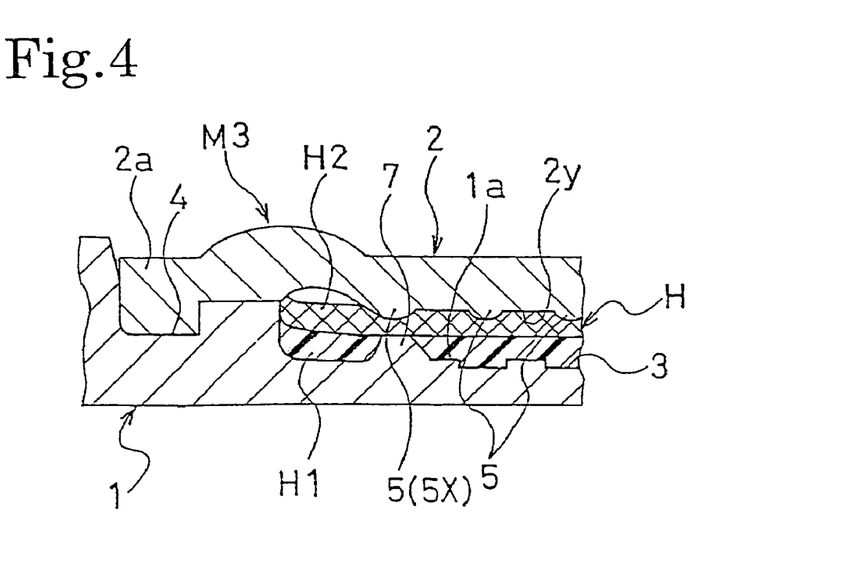
FIG. 4 is a main enlarged cross-sectional view showing another alternative embodiment of a hose coupling according to the present invention, with a hose attached thereto.

FIG. 4 shows another alternative embodiment of a hose coupling according to the present invention. The hose coupling M3 has the same construction as the hose coupling M1 of FIG. 1 except that all the hose gripping projections 5 provided on the radially inner surface portion 2b of the socket 2 have an equal height as in the prior art and one circumferentially extending annular projection 7 is provided on the radially outer surface portion 1a of the hose insertion side of the nipple 1.

The projection 7 is placed on the hose anti-insertion side of the grooves 3, facing the hose gripping projection 5X positioned nearest to the hose anti-insertion side. When the hose H is inserted between the nipple 1 and the socket 2 and is attached by crimping the socket 2, the projection 7 breaks into the elastic tube layer H1 and is press-fitted onto the radially inner surface of the reinforcing layer H2, whereby the reinforcing layer H2 is clamped between the socket 2 and the projection 7. Accordingly, the projection 7 has a projection height such that, when the socket 2 has been crimped, the projection 7 breaks into the elastic tube layer H1 and can be press-fitted onto the radially inner surface of the reinforcing layer H2.

Provision of the projection 7 on the radially outer surface portion of the nipple 1 in this manner, also allows the press-fitting force of the parts 2x which are free from crimping to be increased by the elastic material of the elastic tube layer H1 which has been extruded away. The sealing ability, therefore, can be improved and the same effects as in the above-mentioned embodiment can be obtained.

It is preferable, in terms of increasing hose gripping capability, that the projection 7 have a projection height which allows the projection 7 to break the elastic tube layer H1 and to be press-fitted onto the reinforcing layer H2. The projection height, however, may be arranged such that the compression rate of the elastic tube layer H1 is 55% or more in order to effectively improve the sealing ability as in the embodiment of FIG. 1. Preferably, the projection 7 may have a projection height which enables the elastic tube layer H1 to be compressed at a compression rate 10% greater than that of the part of the elastic tube layer H1 which is compressed by a part of the radially inner surface portion 2b of the socket 2 adjacent to the projection 7.

Figure 5:
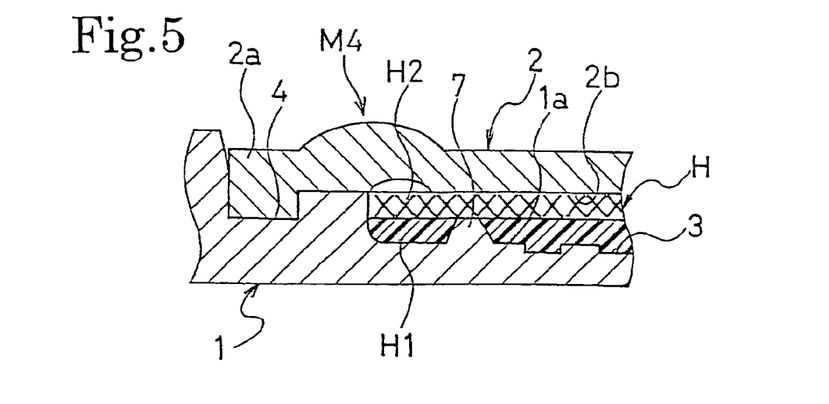
FIG. 5 is a main enlarged cross-sectional view showing still another alternative embodiment of a hose coupling according to the present invention, with a hose attached thereto.

FIG. 5 shows still another alternative embodiment of a hose coupling according to the present invention. The hose coupling M4 has the same construction as the above-mentioned hose coupling M3 except that any hose gripping projections 5 are not provided on the radially inner surface portion 2b of the socket 2 but the projection 7 is provided. When the hose H is attached by crimping the socket 2, the projection 7, as described above, breaks deep into the hose H and is press-fitted onto the reinforcing layer H2, whereby the reinforcing layer H2 is clamped directly between the socket 2 and the projection 7. Since hose gripping capability is improved, it is not necessary to provide any hose gripping projections 5. The hose coupling M4 having the illustrative construction can also obtain the same effects as described above.

It is preferable, in terms of greatly increasing hose gripping capability, that the projection 7 shown in FIG. 5 have a projection height which allows the projection 7 to break the elastic tube layer H1 and to be press-fitted onto the reinforcing layer H2, as shown in the drawing. The projection height, however, may be arranged such that, as in the embodiment of FIG. 3, the compression rate of the elastic tube layer H1 is 55% or more in order to ensure the same hose gripping capability as in the prior art and to effectively improve the sealing ability. Preferably, the projection 7 may have a projection height which enables the elastic tube layer H1 to be compressed at a compression rate 10% greater than that of the part of the elastic tube layer H1 which is compressed by a part of the radially inner surface portion 2b of the socket 2 adjacent to the projection 7, as in the above embodiments.

Provision of one projection 7 illustrated in FIGS. 4 and 5 is sufficient to allow the foregoing effects to be obtained. However, as required, a plurality of projections 7 may be provided, and at least one projection 7 may be provided.

Figure 6A:
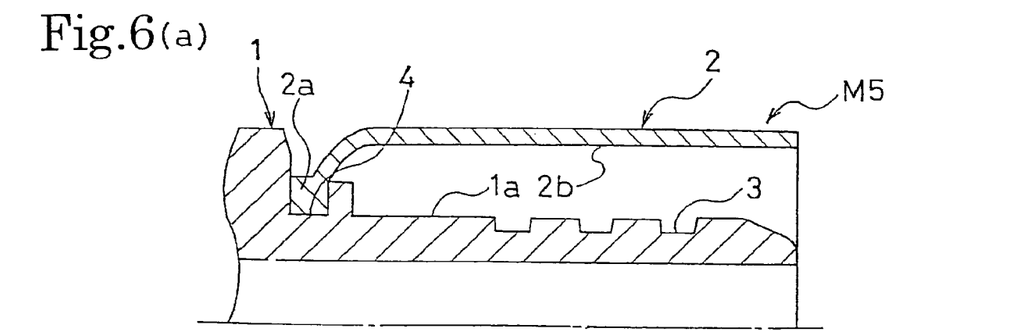
FIG. 6(a) is a main enlarged cross-sectional view showing another embodiment of a hose coupling used for making the attachment construction of the hose coupling and hose in FIG. 1.
Figure 6B:
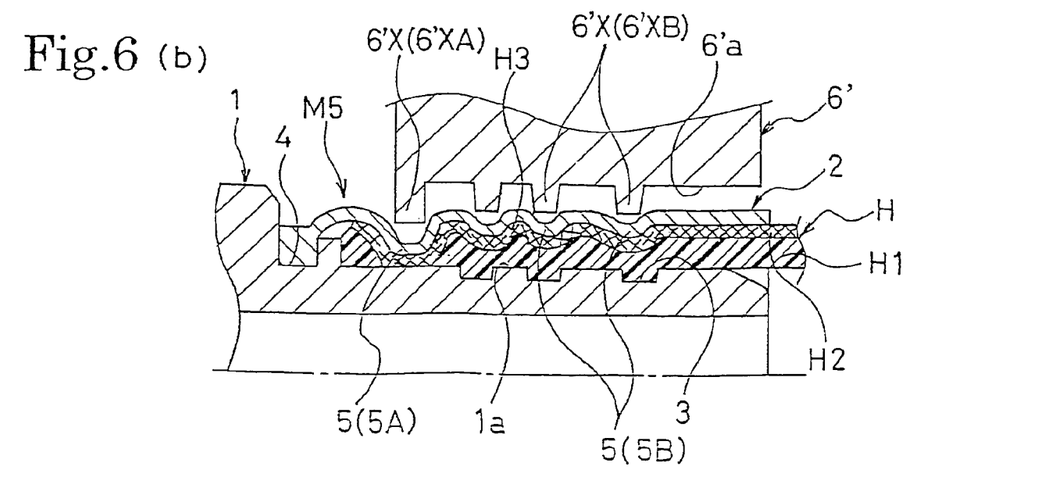
FIG. 6(b) is a main enlarged cross-sectional view showing a state in which a hose is attached by crimping the hose coupling of FIG. 6(a) by means of crimping claws.

FIGS. 6A and 6B show forming of the attachment construction of the hose coupling and the hose shown in FIG. 1 using another hose coupling M5 and crimping claws 6'. In this drawing, there are formed three grooves 3 and four hose gripping projections 4.

The hose coupling M5 has the same construction except that the radially inner surface portion 2b of the socket 2 has no hose gripping projections 5 and is formed flat. Each claw 6' has a press surface 6'a for pressing the socket 2, on which there are provided a plurality of press projections 6'X (four projections in the drawing). One press projection 6'XA of the plurality of press projections 6'X which is positioned nearest to the anti-insertion side has a height greater than other press projections 6'XB. Other press projections 6'XB has an equal height.

When the socket 2 is crimped from its radially outer side by the crimping claws 6' after the end portion H3 of the hose H has been inserted between the nipple 1 and the socket 2, the press projections 6'X greatly deforms each part of the socket 2 corresponding to each of the press projections 6'X radially inward to form the hose gripping projections 5. The press projection 6'XA having a greater projection height depresses the part of the socket 2 deeper than other press projections 6'XB, thereby forming the hose gripping projection 5A which protrudes into the hose H deeper than other hose gripping projections 5B. As a result, the reinforcing layer H2 breaks into the elastic tube layer H1 to extrude away the material of the part thereof and completely breaks it, the reinforcing layer H1 being directly press-fitted onto the radially outer surface portion 1a of the nipple 1, obtaining the attachment construction of the hose H and the hose coupling H5 having the hose gripping projection 5A with a greater projection height which protrudes into the hose H deeper than other hose gripping projections 5B.

In the drawing shown, one hose gripping projection 5A of the hose gripping projections 5 which are formed during crimping protrudes into the hose H deeper than other hose gripping projections 5B. Several hose gripping projections 5, however, may protrude into the hose H deeper using crimping claws 6' having press projections 6'XA with a greater projection height, as required.

The attachment construction as shown in FIG. 3 can also be obtained by securing the hose H between the nipple 1 and socket 2 of the hose coupling M5 by crimping, using crimping claws 6' each of which has only one press projection 6'XA with a greater projection height.

The attachment construction as shown in FIG. 4 may also be formed using the hose coupling M5. In this case, the hose coupling M5 having a projection 7 and crimping claws 6' having only projections 6'XB with an equal projection height are used.

In the present invention, the hose gripping projections 5 may have any shapes if the hose crimped can be gripped; the hose gripping projection 5A having a greater projection height and the projection 7 may also have any projecting shape if the above-mentioned effects can be obtained; for example, a trapezoidal shape in cross section, a sawtooth shape or the like may be employed.

In the embodiments described above, the hose gripping projection 5A and the projection 7 are separately provided. However, as required, a hose coupling may have both the hose gripping projection 5A and the projection 7.

The annular grooves 3 formed on the radially outer surface portion 1a of the hose insertion side of the nipple 1 may have any shapes if the radially inner side of the elastic tube layer H1 can latch into the grooves.

Although a plurality of grooves 3 are placed in the above-mentioned embodiments, it is not necessary to provide the grooves 3 in case of a hose coupling which adequately improves a hose gripping capacity by provision of the hose gripping projection 5A or the projection 7.

The aforementioned hose H attached to the hose couplings of the present invention may preferably be a hose comprising an elastic tube layer H1 formed of rubber, resin, or the like and a reinforcing layer H2 disposed radially outwardly thereof, the reinforcing layer having a metal wire(s) such as steel wire or a reinforcing cord(s) formed of organic fiber or inorganic fiber, which is(are) woven or spirally disposed.

In case that the elastic tube layer H1 is completely broken, as described above, an elastic tube layer H1 formed of polytetrafluoroethylene rein or the like may preferably be used for easy breaking.

EXAMPLE 1

Prepared were couplings according to the present invention 1~3 and to the prior art, the present invention couplings 1~3 having a construction shown in FIG. 1 and the prior art coupling having a construction shown in FIG. 7. The projection height of the hose gripping projection, positioned nearest to the hose anti-insertion side, of each of the present invention couplings was arranged such that, when a hose was crimped and secured, the compression rate of the elastic tube layer was shown in Table 1, the prior art coupling having hose gripping projections with an equal projection height.

An SAE100R14 standard hose (No. 14 hose belonging to a 100R series, J517, Society of Automotive Engineers. Inc. standard) was attached to each of the test couplings to obtain present invention test assemblies 1~3 having the present invention couplings 1~3 and the hoses and a conventional test assembly having the prior art coupling and the hose.

The above hose was comprised of an elastic tube layer formed of polytetrafluoroethylene rein and a reinforcing layer formed from woven steel wires. The compression rate of the elastic tube layer compressed by other hose gripping projections of the present invention couplings 1 and 3 was 45%, and the compression rate of the elastic tube layer compressed by other hose gripping projections of the present invention couplings 2 was 20%. The compression rate of the elastic tube layer compressed by each hose gripping projection of the prior art coupling was 45%.

Evaluation testing for sealing ability was conducted in the following measurement manner using the test assemblies, obtaining the results shown in Table 1.

Sealing Ability

Each test assembly was filled with oil, and was then left in a constant temperature oven at an atmosphere temperature of 232° C. for 48 hours. After that, the test assembly was taken from the constant temperature oven, and a high temperature oil at a temperature of 150° C. was circulated through the test assembly for one hour, just before the test assembly was filled with oil and pressurized. The pressure at which the leaking of oil occurred between the coupling and the hose was measured as gradually increasing the pressure applied to the test assembly. In Table 1, hose breaking means that the hose was broken at a pressure of about 55 MPa without occurrence of oil leaking between the coupling and the hose.

TABLE 1

|  | Present invention test assembly 1 | Present invention test assembly 2 | Present invention test assembly 3 | Conventional test assembly |
|---|---|---|---|---|
| Compression Rate (%) | 55 | 75 | 100 | 45 |
| Sealing Ability (MPa) | Hose breaking | Hose breaking | Hose breaking | 32.0 |

Table 1 shows that the present invention couplings having the construction shown in FIG. 1 can improve sealing ability, thereby allowing them to be used at a pressure greater than that in the prior art.

EXAMPLE 2

Couplings 4~7 according to the present invention were prepared, each having a construction in which there was provided only one hose gripping projection nearest to the hose anti-insertion side, as shown in FIG. 3, its projection height being arranged such that, when a hose was crimped and secured, the compression rate of the elastic tube layer was shown in Table 2.

In Table 2, compression rate A is a compression rate of the elastic tube layer by the hose gripping projection. Compression rate B is a compression rate of the elastic tube layer by the radially inner surface portion of the socket after attachment of a hose.

A hose having the same construction as in Example 1 was attached to each of the test couplings to obtain present invention test assemblies 4~7 having the present invention couplings 4~7 and the hoses.

Evaluation testing for sealing ability was conducted in the measurement manner shown in Example 1, using the test assemblies, thereby obtaining the results shown in Table 2.

TABLE 2

|  | Present invention test assembly 4 | Present invention test assembly 5 | Present invention test assembly 6 | Present invention test assembly 7 |
|---|---|---|---|---|
| Compression Rate A (%) | 55 | 55 | 75 | 100 |
| Compression Rate B (%) | 50 | 45 | 20 | 45 |
| Difference A-B (%) | 5 | 10 | 55 | 55 |
| Seal Ability (MPa) | 39.8 | Hose breaking | Hose breaking | Hose breaking |

Table 2 shows that the present invention couplings having the construction shown in FIG. 3 can also improve sealing ability, thereby allowing them to be used at a pressure greater than that in the prior art.

In addition, it can be seen that it is preferable that the compression rate of the elastic tube layer compressed by the hose gripping projection be 10% greater than that of the part of the elastic tube layer compressed by the part of the radially inner surface portion of the socket.

EXAMPLE 3

Couplings 8~10 according to the present invention were prepared, each having a construction in which there was provided a circumferentially extending annular projection on the raidally outer surface portion of the nipple, as shown in FIG. 4, its projection height being arranged such that, when a hose was crimped and secured, the compression rate of the elastic tube layer was shown in Table 3.

A hose having the same construction as in Example 1 was attached to each of the test couplings to obtain present invention test assemblies 8~10 having the present invention couplings 8~10 and the hoses. The compression rate of the elastic tube layer compressed by other hose gripping projections of the present invention couplings 8 and 10 was 45%, and the compression rate of the elastic tube layer compressed by other hose gripping projections of the present invention couplings 9 was 20%.

Evaluation testing for sealing ability was conducted in the measurement manner shown in Example 1, using the test assemblies, thereby obtaining the results shown in Table 3.

TABLE 3

|  | Present invention test assembly 8 | Present invention test assembly 9 | Present invention test assembly 10 |
|---|---|---|---|
| Compression Rate (%) | 55 | 75 | 100 |
| Sealing Ability (MPa) | Hose breaking | Hose breaking | Hose breaking |

Table 3 shows that the present invention couplings having the construction shown in FIG. 4 can also improve sealing ability, thereby allowing them to be used at a pressure greater than that in the prior art.

EXAMPLE 4

Couplings 11~14 according to the present invention were prepared, each having a construction in which there was provided a circumferentially extending annular projection on the radially outer surface portion of the nipple, as shown in FIG. 5, its projection height being arranged such that, when a hose was crimped and secured, the compression rate of the elastic tube layer was shown in Table 4.

In Table 4, compression rate A is a compression rate of the elastic tube layer by the above projection. Compression rate B is a compression rate of the elastic tube layer by the radially inner surface portion of the socket after attachment of a hose.

A hose having the same construction as in Example 1 was attached to each of the test couplings to obtain present invention test assemblies 11~14 having the present invention couplings 11~14 and the hoses.

Evaluation testing for sealing ability was conducted in the measurement manner shown in Example 1, using the test assemblies, thereby obtaining the results shown in Table 4.

TABLE 4

|  | Present invention test assembly 11 | Present invention test assembly 12 | Present invention test assembly 13 | Present invention test assembly 14 |
|---|---|---|---|---|
| Compression Rate A (%) | 55 | 55 | 75 | 100 |
| Compression Rate B (%) | 50 | 45 | 20 | 45 |
| Difference A-B (%) | 5 | 10 | 55 | 55 |
| Seal Ability (MPa) | 39.8 | Hose breaking | Hose breaking | Hose breaking |

Table 4 shows that the present invention couplings having the construction shown in FIG. 5 can also improve sealing ability, thereby allowing them to be used at a pressure greater than that in the prior art.

In addition, it can be seen that it is preferable that the compression rate of the elastic tube layer compressed by the hose gripping projection be 10% greater than that of the part of the elastic tube layer compressed by the part of the radially inner surface portion of the socket.

As mentioned above, the present invention can improve sealing ability without reducing any advantages that conventional hose couplings of the crimping type have, by provision of a hose gripping projection with a greater projection height on the radailly inner surface of the nipple or by provision of a projection on the radially outer surface of the socket.

INDUSTRIAL APPLICABILITY

The hose coupling of the present invention having the aforementioned excellent effects can be used very effectively as a coupling for connecting a hose to an equipment.

What is claimed is:

1. A method of attaching a hose coupling to a hose, the hose coupling having a cylindrical nipple and a cylindrical socket disposed radially outwardly thereof, the nipple having a hose insertion side and a hose anti-insertion side, the socket having a radially inner surface having at least one circumferentially extending annular hose gripping projection thereon, the hose having an elastic tube layer formed of polytetrafluoroethylene and a reinforcing layer disposed radially outwardly thereof, the method comprising the steps of:

inserting one end of the hose between the nipple and socket; and crimping the socket from a radially outer side thereof by means of crimping claws circularly placed radially outwardly of the socket to radially inwardly reduce the socket with gaps being created between adjacent claws, thereby protruding the at least one circumferentially extending annular hose gripping projection into said one end of the hose so that a part of the reinforcing layer into which the at least one circumferentially extending annular hose gripping projection has been protruded is protruded into the elastic layer to extrude away and break apart the elastic layer into which the part of the reinforcing layer has been extruded, and so that the part of the reinforcing layer is pressed against a radially outer surface of the nipple and directly gripped between the at least one circumferentially extending annular hose gripping projection and the nipple, while compressing said one end of the hose by the radially inner surface of the reduced socket.

2. The method of attaching a hose coupling to a hose according to claim 1, wherein the radially inner surface of the socket hat a plurality of circumferentially extending annular hose gripping projections provided thereon at a predetermined interval in a longitudinal direction of the socket, the at least one circumferentially extending annular hose gripping projection comprising at least one of the plurality of circumferentially extending annular hose gripping projections and protruding radially inwardly of the socket greater than other hose gripping projections.

3. The method of attaching a hose coupling to a hose according to claim 2, wherein the at least one circumferentially extending annular hose gripping projection includes a hose gripping projection nearest to the hose anti-insertion side.

4. The method of attaching a hose coupling to a hose according to claim 3, wherein the at least one circumferentially extending annular hose gripping projection is a hose gripping projection nearest to the hose anti-insertion side.

5. The method of attaching a hose coupling to a hose according to claim 4, wherein the radially outer surface of the nipple has a plurality of circumferentially extending annular grooves provided thereon at a predetermined interval in a longitudinal direction of the nipple, the step of crimping the socket comprising protruding the at least one circumferentially extending annular hose gripping projection into said one end of the hose at a position on the hose anti-insertion side of the plurality of circumferentially extending annular grooves and the other hose gripping projections into said one end of the hose at positions facing the plurality of circumferentially extending annular grooves.

6. The method of attaching a hose coupling to a hose according to claim 1, wherein the hose consists of the elastic tube layer and the reinforcing layer.

7. A method of attaching a hose coupling to a hose, the hose coupling having a cylindrical nipple and a cylindrical socket disposed radially outwardly thereof, the nipple having a hose insertion side and a hose anti-insertion side, the nipple having a radially outer surface having at least one circumferentially extending annular projection thereon, the hose having an elastic tube layer formed of polytetrafluoroethylene and a reinforcing layer disposed radially outwardly thereof, the method comprising the steps of:

inserting one end of the hose between the nipple and the socket; and crimping the socket from a radially outer side thereof by means of crimping claws circularly placed radially outwardly of the socket to radially inwardly reduce the socket with gaps being created between adjacent claws, thereby protruding the at least one circumferentially extending annular projection into said one end of the hose so that a part of the elastic tube layer into which the at least one circumferentially extending annular projection has been protruded is extruded away and broken to press the at least one circumferentially extending annular projection against a radially inner surface of the reinforcing layer, and so that the reinforcing layer is directly gripped between the at least one circumferentially extending annular projection and the socket, while compressing said one end of the hose by the radially inner surface of the reduced socket.

8. The method of attaching a hose coupling to a hose according to claim 7, wherein the radially inner surface of the socket has a plurality of circumferentially extending annular hose gripping projections provided thereon at a predetermined interval in a longitudinal direction of the socket, the step of crimping the hose comprising protruding the at least one circumferentially extending annular projection into said one end of the hose at a position facing one of the plurality of circumferentially extending annular hose gripping projection nearest to the hose anti-insertion side so that the reinforcing layer is directly gripped between the at least one circumferentially extending annular projection and the one circumferentially extending annular hose gripping projection nearest to the hose anti-insertion side.

9. The method of attaching a hose coupling to a hose according to claim 8, wherein the radially outer surface of the nipple has a plurality of circumferentially extending annular grooves provided thereon at a predetermined interval in a longitudinal direction of the nipple on the hose insertion side of the at least one circumferentially extending annular projection, the step of crimping the socket comprising protruding a remainder of the plurality of circumferentially extending annular hose gripping projections into said one end the hose at positions facing to the plurality of circumferentially extending annular grooves.

10. The method of attaching a hose coupling to a hose according to claim 7, wherein the hose consists of the elastic tube layer and the reinforcing layer.

11. A method of attaching a hose coupling to a hose, the hose coupling having a cylindrical nipple and a cylindrical socket disposed radially outwardly thereof, the nipple having a hose insertion side and a hose anti-insertion side, the hose having an elastic tube layer formed of polytetrafluoroethylene and a reinforcing layer disposed radially outwardly thereof, using crimping claws circularly placed radially outwardly of the socket, the crimping claws each having at least one press projection for pressing the socket, the method comprising the steps of:

inserting one end of the hose between the nipple and socket; and crimping the socket from a radially outer side thereof by means of the crimping claws with gaps being created between adjacent claws, thereby pressing a part of the socket by the at least one press projection to deform the part of the socket radially inwardly and to protrude the part of the socket into said one end of the hose so that a part of the reinforcing layer into which the part of the socket has been protruded is protruded into the elastic layer to extrude away and break apart of the elastic layer into which the part of the reinforcing layer has been extruded, and so that the part of the reinforcing layer is pressed against a radially outer surface of the nipple and directly gripped between the part of the socket and the nipple, while compressing said one end of the hose by a radially inner surface of the socket.

12. The method of attaching a hose coupling to a hose according to claim 11, wherein the crimping claws each have a plurality of press projections at a predetermined interval in a longitudinal direction of the socket, the at least one press projection comprising at least one of the plurality of press projections and protruding greater than other press projections.

13. The method of attaching a hose coupling to a hose according to claim 12, wherein the at least one press projection includes a press projection nearest to the hose anti-insertion side.

14. The method of attaching a hose coupling to a hose according to claim 11, wherein the hose consists of the elastic tube layer and the reinforcing layer.

* * * * *